United States Patent
Kang et al.

(10) Patent No.: US 10,054,820 B2
(45) Date of Patent: *Aug. 21, 2018

(54) PHOTOALIGNMENT AGENT, PHOTOALIGNMENT FILM, LIQUID CRYSTAL DISPLAY DEVICE, AND METHOD OF MANUFACTURING THE SAME

(71) Applicant: Samsung Display Co., Ltd., Yongin (KR)

(72) Inventors: Suk Hoon Kang, Seoul (KR); Jun Woo Lee, Seongnam-si (KR); Jin-Soo Jung, Hwaseong-si (KR); Jong Hwan Jeon, Gwangju-si (KR); Baek Kyun Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/723,672

(22) Filed: May 28, 2015

(65) Prior Publication Data

US 2016/0109759 A1    Apr. 21, 2016

(30) Foreign Application Priority Data

Oct. 21, 2014    (KR) .................... 10-2014-0142528

(51) Int. Cl.
| | |
|---|---|
| *C09K 19/56* | (2006.01) |
| *G02F 1/1337* | (2006.01) |
| *C08G 73/06* | (2006.01) |

(52) U.S. Cl.
CPC .... *G02F 1/133711* (2013.01); *C08G 73/0672* (2013.01); *C09K 19/56* (2013.01);
(Continued)

(58) Field of Classification Search
CPC ........... G02F 1/133723; G02F 1/13378; G02F 1/133788; G02F 1/133711;
(Continued)

(56) References Cited

U.S. PATENT DOCUMENTS

| | | |
|---|---|---|
| 6,063,829 A | 5/2000 | Endou et al. |
| 2007/0071913 A1 | 3/2007 | Fujii et al. |

(Continued)

FOREIGN PATENT DOCUMENTS

| | | | |
|---|---|---|---|
| JP | 2005275360 A | * | 10/2005 |
| JP | 2008033257 A | * | 2/2008 |

(Continued)

OTHER PUBLICATIONS

Non-Final Office Action dated Dec. 7, 2016, in U.S. Appl. No. 14/740,773.
(Continued)

*Primary Examiner* — Ruiyun Zhang
(74) *Attorney, Agent, or Firm* — H.C. Park & Associates, PLC

(57) ABSTRACT

A photoalignment agent includes: a copolymer obtained from at least one of cyclobutane dianhydride (CBDA) and a cyclobutane dianhydride derivative, and a diamine; and a cross-linking agent including an alkylene group —$C_nH_{2n}$—, n being a natural number.

21 Claims, 8 Drawing Sheets

(52) U.S. Cl.
CPC .............. *G02F 1/133788* (2013.01); *G02F 2001/133742* (2013.01); *Y10T 428/10* (2015.01); *Y10T 428/1005* (2015.01); *Y10T 428/1018* (2015.01); *Y10T 428/1023* (2015.01)

(58) Field of Classification Search
CPC ......... G02F 1/134309; G02F 1/136277; Y10T 428/10; Y10T 428/1005; Y10T 428/018; Y10T 428/1023; C08G 73/10; C08G 73/1007; C08G 73/0146; C08G 73/1064; C09D 179/08; C09K 19/56
USPC ........ 428/1.1, 1.2, 1.25, 1.26; 349/123, 130, 349/132; 524/600, 602; 525/436; 528/310, 350, 353
See application file for complete search history.

(56) References Cited

U.S. PATENT DOCUMENTS

| | | | |
|---|---|---|---|
| 2010/0243955 A1 | 9/2010 | Tsai et al. | |
| 2010/0272979 A1 | 10/2010 | Marck et al. | |
| 2012/0196054 A1* | 8/2012 | Lee | G02F 1/133788 428/1.26 |
| 2012/0295199 A1 | 11/2012 | Takeyama et al. | |
| 2014/0072730 A1 | 3/2014 | Hwang et al. | |

FOREIGN PATENT DOCUMENTS

| | | | | |
|---|---|---|---|---|
| JP | 2008-116809 | 5/2008 | | |
| JP | 2012-093642 | 5/2012 | | |
| JP | WO 2015072554 A1 * | 5/2015 | ....... | G02F 1/133723 |
| KR | 10-2010-0043020 | 4/2010 | | |
| KR | 10-2010-0085068 | 7/2010 | | |
| KR | 10-2011-0037839 | 4/2011 | | |
| KR | 10-2011-0072173 | 6/2011 | | |
| KR | 10-2011-0109340 | 10/2011 | | |
| WO | 2008/153287 | 12/2008 | | |
| WO | 2012/176822 | 12/2012 | | |
| WO | 2013/094734 | 6/2013 | | |

OTHER PUBLICATIONS

Final Office Action dated Mar. 29, 2017, in U.S. Appl. No. 14/740,773.
Double Bond Chemical Ind. Co., Ltd., "CHICURE® 800 Cross-linking agents for polyester powder coatings," Jan. 2004, New Taipei City, Taiwan.
Dirk Schmaljohann et al., "Modification with alkyl chains and the influence on thermal and mechanical properties of aromatic hyperbranched polyesters," Macromolecular Chemistry and Physics, Jan. 1, 2000, pp. 49-57, vol. 201, Issue 1, WILEY-VCH Verlag GmbH, Weinheirn, Germany.
The Extended European Search Report dated Jan. 18, 2016, in European Patent Application No. 15183564.2.
Non Final Office Action dated Sep. 22, 2017, in U.S. Appl. No. 14/740,773.
Final Office Action dated Feb. 12, 2018, in U.S. Appl. No. 14/740,773.
Notice of Allowance dated Apr. 25, 2018, in U.S. Appl. No. 14/740,773.

* cited by examiner

PHOTOALIGNMENT AGENT, PHOTOALIGNMENT FILM, LIQUID CRYSTAL DISPLAY DEVICE, AND METHOD OF MANUFACTURING THE SAME

CROSS-REFERENCE TO RELATED APPLICATION

This application claims priority from and the benefit of Korean Patent Application No. 10-2014-0142528, filed on Oct. 21, 2014, which is hereby incorporated by reference for all purposes as if fully set forth herein.

BACKGROUND

Field

Exemplary embodiments of the present invention relate to a photoalignment agent, a photoalignment layer, a liquid crystal display device, and a manufacturing method thereof.

Discussion of the Background

To display images in a liquid crystal display device, the alignment of liquid crystals between sheets of transparent conductive glass may be modified using an external electrical field. The liquid crystals may be aligned in a predetermined direction at the interface between the liquid crystals and the transparent conductive glass. The degree of uniformity of the liquid crystal alignment may be an important factor for determining the display quality of the liquid crystal display device.

In a conventional method of aligning the liquid crystals, a rubbing method where a polymer layer such as a polyimide is coated on a substrate such as glass and the surface is rubbed in a predetermined direction by using a fiber material such as nylon or polyester may be used. However, minute particles or an electrostatic discharge (ESD) may be generated when the fiber material and the polymer layer are rubbed against each other, and they may cause a problem during the manufacturing of the liquid crystal display device.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a photoalignment agent, a photoalignment layer, a liquid crystal display device, and a manufacturing method thereof. According to the exemplary embodiments of the present invention, afterimages and film strength may be optimized.

Additional aspects will be set forth in the detailed description which follows, and, in part, will be apparent from the disclosure, or may be learned by practice of the inventive concept.

An exemplary embodiment of the present invention discloses a photoalignment agent including: a copolymer obtained from at least one of cyclobutane dianhydride (CBDA) and a cyclobutane dianhydride derivative, and a diamine; and a cross-linking agent including an alkylene group —$C_nH_{2n}$—, n being a natural number.

The cross-linking agent may include at least one of compounds that are respectively represented by Chemical Formula 1, Chemical Formula 2, Chemical Formula 3, and Chemical Formula 4.

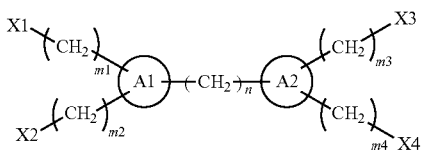

Chemical Formula 1

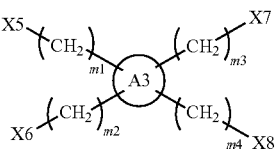

Chemical Formula 2

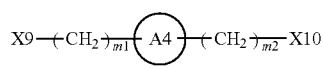

Chemical Formula 3

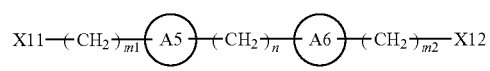

Chemical Formula 4

In Chemical Formula 1, Chemical Formula 2, Chemical Formula 3, and Chemical Formula 4, n indicates a natural number in a range of 2 to 11, each of m1 to m4 independently indicates a natural number in a range of 1 to 4, A1 and A2 are independently

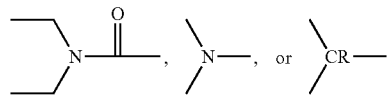

(herein, R is H or a C1 to C3 alkyl group), a C6 to C30 aromatic compound, or a C4 to C20 aliphatic cyclic compound, A3 is

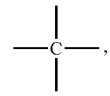

a C6 to C30 aromatic compound, or a C4 to C20 aliphatic cyclic compound, A4, A5, and A6 are independently a single bond, —$CH_2$—, —COO—, —OCO—, —S—, —O—, —$CH_2CH_2O$—, —$OCH_2CH_2$—, a C6 to C30 aromatic compound, or a C4 to C20 aliphatic cyclic compound, and X1, X2, X3, X4, X5, X6, X7, X8, X9, X10, X11, and X12 independently indicate —OH, —$NH_2$, an acrylate group, a methacrylate group, a vinyl group, or

The cross-linking agent may include a compound that is represented by Chemical Formula 5.

Chemical Formula 5

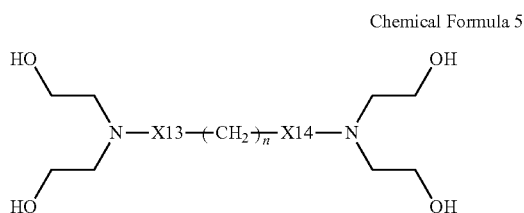

In Chemical Formula 5, n is a natural number of 3 to 11, X13 and X14 independently indicate —(CH$_2$)$_m$—O—, —O—(CH$_2$)$_m$—, —(CH$_2$)$_m$—S—, —S—(CH$_2$)$_m$— (herein, m is a natural number of 1 to 10),

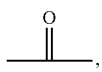

a C6 to C30 aromatic compound, or a C4 to C20 aliphatic cyclic compound.

The cross-linking agent may include a compound that is represented by Chemical Formula 6.

Chemical Formula 6

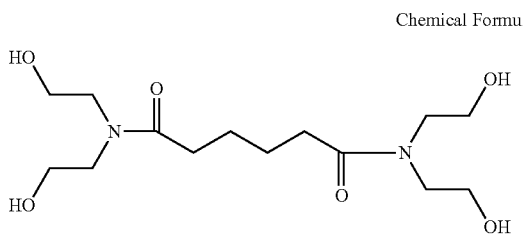

The cross-linking agent may be included in the photoalignment agent at about 3 wt % to 10 wt % with respect to all contents.

The diamine may include a compound that is represented by Chemical Formula 7.

Chemical Formula 7

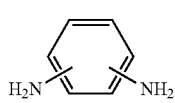

The cyclobutane dianhydride may include a compound that is represented by Chemical Formula 8, and the cyclobutane dianhydride derivative may include a compound that is represented by Chemical Formula 9.

Chemical Formula 8

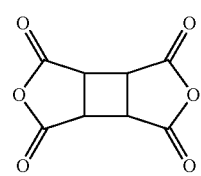

Chemical Formula 9

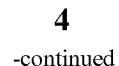

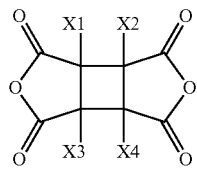

In Chemical Formula 9, X1, X2, X3, and X4 independently indicate hydrogen, a halogen, or an alkyl group, and at least one of X1, X2, X3, and X4 does not indicate hydrogen.

The copolymer may include polyamic acid.

An exemplary embodiment of the present invention also discloses a photoalignment layer including: a photoalignment layer including a copolymer obtained from at least one of cyclobutane dianhydride (CBDA) and a cyclobutane dianhydride derivative, and a diamine; and a cross-linking agent including an alkylene group —C$_n$H$_{2n}$—, n being a natural number, wherein the copolymer includes polyimide.

An exemplary embodiment of the present invention also discloses a liquid crystal display including: a first substrate; a thin film transistor disposed on the first substrate; a first electrode connected to the thin film transistor; and a first alignment layer disposed on the first electrode. The first alignment layer includes: a copolymer obtained from at least one of cyclobutane dianhydride (CBDA) and a cyclobutane dianhydride derivative, and a diamine; and a cross-linking agent including an alkylene group —C$_n$H$_{2n}$—, n being a natural number, wherein the copolymer includes a polyimide.

The cross-linking agent may include at least one of compounds that are respectively represented by Chemical Formula 1, Chemical Formula 2, Chemical Formula 3, and Chemical Formula 4.

Chemical Formula 1

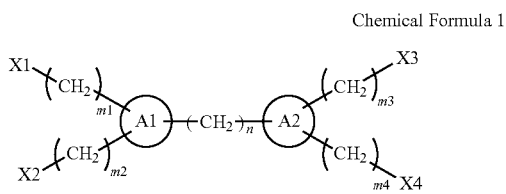

Chemical Formula 2

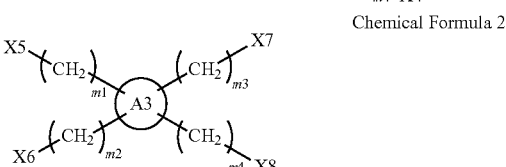

Chemical Formula 3

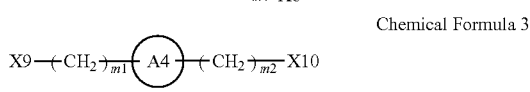

Chemical Formula 4

In Chemical Formula 1, Chemical Formula 2, Chemical Formula 3, and Chemical Formula 4, n indicates a natural number in a range of 2 to 11, each of m1 to m4 independently indicates a natural number in a range of 1 to 4, A1 and A2 are independently

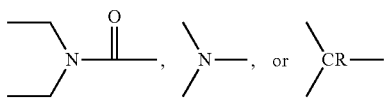

(herein, R is H or a C1 to C3 alkyl group), a C6 to C30 aromatic compound, or a C4 to C20 aliphatic cyclic compound, A3 is

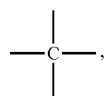

a C6 to C30 aromatic compound, or a C4 to C20 aliphatic cyclic compound, A4, A5, and A6 independently are a single bond, —$CH_2$—, —COO—, —OCO—, —S—, —O—, —$CH_2CH_2O$—, —$OCH_2CH_2$—, a C6 to C30 aromatic compound, or a C4 to C20 aliphatic cyclic compound, and X1, X2, X3, X4, X5, X6, X7, X8, X9, X10, X11, and X12 independently indicate —OH, —$NH_2$, an acrylate group, a methacrylate group, a vinyl group, or

The cross-linking agent may include a compound that is represented by Chemical Formula 5.

Chemical Formula 5

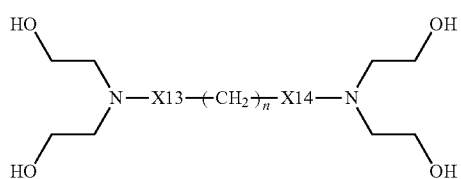

In Chemical Formula 5, n is a natural number of 3 to 11, X13 and X14 independently indicate —$(CH_2)_m$—O—, —O—$(CH_2)_m$—, —$(CH_2)_m$—S—, —S—$(CH_2)_m$— (herein, m is a natural number of 1 to 10),

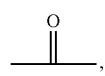

a C6 to C30 aromatic compound, or a C4 to C20 aliphatic cyclic compound.

The cross-linking agent may include a compound that is represented by Chemical Formula 6.

Chemical Formula 6

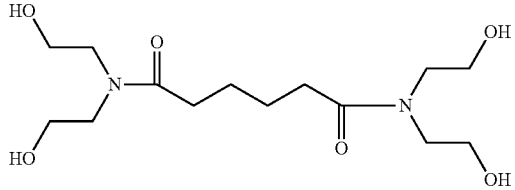

The cross-linking agent may be included in the photoalignment agent at about 3 wt % to 10 wt % with respect to all contents.

The diamine may include a compound that is represented by Chemical Formula 7.

Chemical Formula 7

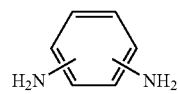

The copolymer may include at least one of repeated units that are respectively represented by Chemical Formula 10 and Chemical Formula 11.

Chemical Formula 10

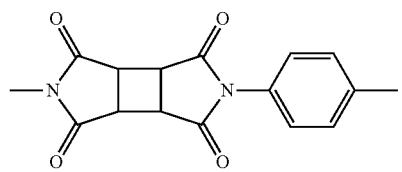

Chemical Formula 11

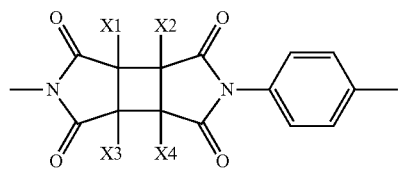

In Chemical Formula 11, X1, X2, X3, and X4 independently indicate hydrogen, a halogen, or an alkyl group, and at least one of X1, X2, X3, and X4 does not indicate hydrogen.

The liquid crystal display may further include a second electrode disposed on the first substrate, and an insulating layer may be disposed between the first electrode and the second electrode.

The first electrode may include a plurality of branch electrodes, and the second electrode may have a planar shape.

The branch electrodes may overlap the second electrode having the planar shape.

The liquid crystal display may further include a passivation layer disposed between the thin film transistor and the second electrode, and the thin film transistor and the first electrode may be connected to each other through a contact hole penetrating through the passivation layer and the insulating layer.

The liquid crystal display may further include: a second substrate facing the first substrate; a second alignment layer disposed on the second substrate; and a liquid crystal layer disposed between the first substrate and the second substrate and including liquid crystal molecules, and the second alignment layer may be formed of a same material as the first alignment layer.

An exemplary embodiment of the present invention also discloses a manufacturing method of a liquid crystal display, including: forming a thin film transistor on a first substrate; forming a passivation layer on the thin film transistor; forming a first electrode and a second electrode on the passivation layer with an insulating layer disposed between the first electrode and the second electrode; coating a photoalignment agent on the first electrode or the second electrode; baking the photoalignment agent; and forming a first alignment layer by irradiating polarized light to the photoalignment agent. The photoalignment agent includes: a copolymer obtained from at least one of cyclobutane dianhydride (CBDA) and a cyclobutane dianhydride derivative, and a diamine; and a cross-linking agent including an alkylene group —$C_nH_{2n}$—, n being a natural number.

The photoalignment agent may be formed by polymerizing at least one of the cyclobutane dianhydride represented by Chemical Formula 8 and the cyclobutane dianhydride derivative represented by Chemical Formula 9, and the first diamine represented by Chemical Formula 7.

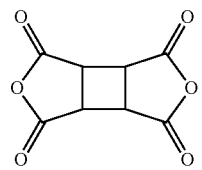

Chemical Formula 8

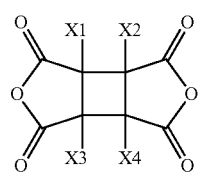

Chemical Formula 9

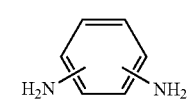

Chemical Formula 7

In Chemical Formula 9, X1, X2, X3, and X4 independently indicate hydrogen, a halogen, or an alkyl group, and at least one of X1, X2, X3, and X4 does not indicate hydrogen.

The cross-linking agent may include at least one of compounds that are respectively represented by Chemical Formula 1, Chemical Formula 2, Chemical Formula 3, and Chemical Formula 4.

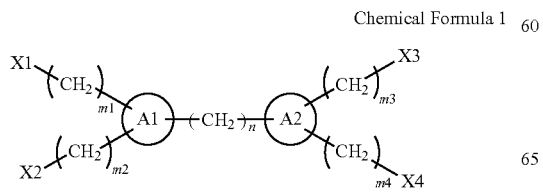

Chemical Formula 1

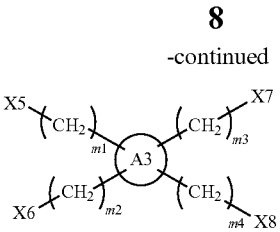

Chemical Formula 2

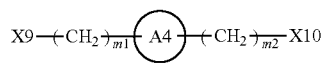

Chemical Formula 3

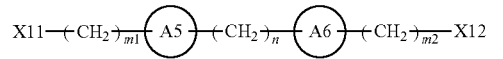

Chemical Formula 4

In Chemical Formula 1, Chemical Formula 2, Chemical Formula 3, and Chemical Formula 4, n indicates a natural number in a range of 2 to 11, each of m1 to m4 independently indicates a natural number in a range of 1 to 4, A1 and A2 are independently

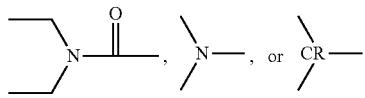

(herein, R is H or a C1 to C3 alkyl group), a C6 to C30 aromatic compound, or a C4 to C20 aliphatic cyclic compound, A3 is

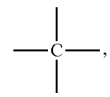

a C6 to C30 aromatic compound, or a C4 to C20 aliphatic cyclic compound, A4, A5, and A6 independently are a single bond, —$CH_2$—, —COO—, —OCO—, —S—, —O—, —$CH_2CH_2O$—, —$OCH_2CH_2$—, a C6 to C30 aromatic compound, or a C4 to C20 aliphatic cyclic compound, and X1, X2, X3, X4, X5, X6, X7, X8, X9, X10, X11, and X12 independently indicate —OH, —$NH_2$, an acrylate group, a methacrylate group, a vinyl group, or

The cross-linking agent may include a compound that is represented by Chemical Formula 5.

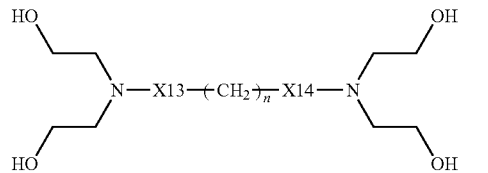

Chemical Formula 5

In Chemical Formula 5, n is a natural number of 3 to 11, X13 and X14 independently indicate —(CH$_2$)$_m$—O—, —O—(CH$_2$)$_m$—, —(CH$_2$)$_m$—S—, —S—(CH$_2$)$_m$— (herein, m is a natural number of 1 to 10),

a C6 to C30 aromatic compound, or a C4 to C20 aliphatic cyclic compound.

The cross-linking agent may include a compound that is represented by Chemical Formula 6.

Chemical Formula 6

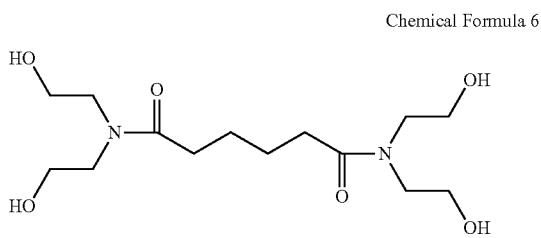

The cross-linking agent may be included in the photoalignment agent at about 3 wt % to 10 wt % with respect to all contents.

The polarized light may have energy in a range of 0.20 J/cm$^2$ to 1.0 J/cm$^2$.

The manufacturing method may further include performing an additional baking process after irradiating the polarized light.

According to the exemplary embodiments of the present invention, it is possible to realize a liquid crystal display which can optimize an afterimage and a film strength by forming a photoalignment layer by mixing and using a photodecompositional alignment material and a cross-linking agent including a flexible group.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
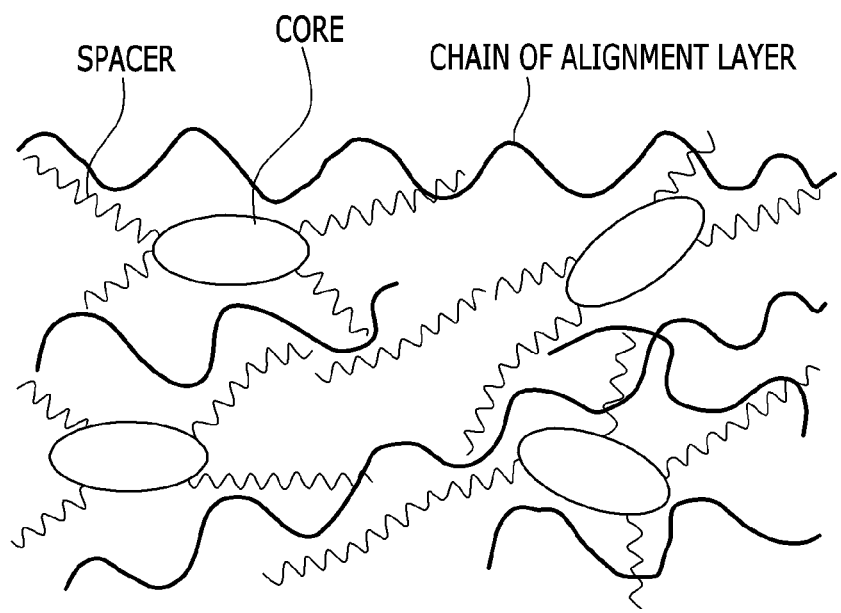
FIG. 1 schematically illustrates a cross-linking agent mixed in a photoalignment layer according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A photoalignment agent according to an exemplary embodiment of the present invention includes (a) a copolymer obtained from at least one compound of cyclobutane dianhydride (CBDA) and a cyclobutane dianhydride derivative, and a diamine and (b) a cross-linking agent including an alkylene group (—CnH2n-, n being a natural number).

Herein, the cyclobutane dianhydride may be a compound that is represented by Chemical Formula 8, and the cyclobutane dianhydride derivative may be a compound that is represented by Chemical Formula 9.

Chemical Formula 8

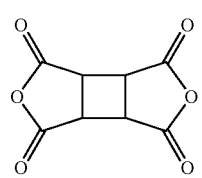

Chemical Formula 9

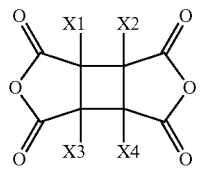

In Chemical Formula 9, X1, X2, X3, and X4 independently indicate hydrogen, a halogen, or an alkyl group, and at least one of X1, X2, X3, and X4 does not indicate hydrogen. The cyclobutane dianhydride derivative includes a compound that is represented by Chemical Formula 9-1 or Chemical Formula 9-2.

Chemical Formula 9-1

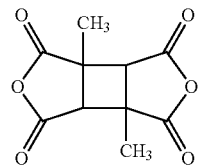

Chemical Formula 9-2

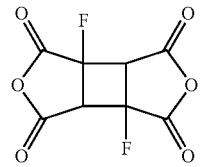

In the present exemplary embodiment, the first diamine may be a compound that is represented by Chemical Formula 7.

Chemical Formula 7

The diamine is not limited to the compound that is represented by Chemical Formula 7, but may be a compound in which hydrogen coupled to ring-like carbon is substituted with an alkyl group, a halogen, sulfur, or the like from Chemical Formula 5, an aromatic diamine such as p-phenylenediamine, m-phenylenediamine, 2,5-diaminotoluene, 2,6-diaminotoluene, 4,4'-diaminobiphenyl, 3,3'-dimethyl-4, 4'-diaminobiphenyl, 3,3'-dimethoxy-4,4'-diaminobiphenyl, diaminodiphenylmethane, diaminodiphenylether, 2,2'-diaminodiphenylpropane, bis(3,5-diethyl-4-aminophenyl) methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl) anthracene, 1,3-bis(4-aminophenoxy)benzene, 4,4'-bis(4-aminophenoxy)diphenyl sulfone, 2,2-bis[4-(4-minophenoxy)phenyl]propane, 2,2-bis(4-aminophenyl) hexafluoropropane, or 2,2-bis[4-(4-minophenoxy)phenyl] hexafluoropropane, an aliphatic diamine such as bis(4-aminocyclohexyl)methane or bis(4-amino-3-methylcyclohexyl)methane, and an aliphatic diamine such as tetramethylenediamine or hexamethylenediamine.

In the present exemplary embodiment, the cross-linking agent may include at least one of compounds that are respectively represented by Chemical Formula 1, Chemical Formula 2, Chemical Formula 3, and Chemical Formula 4.

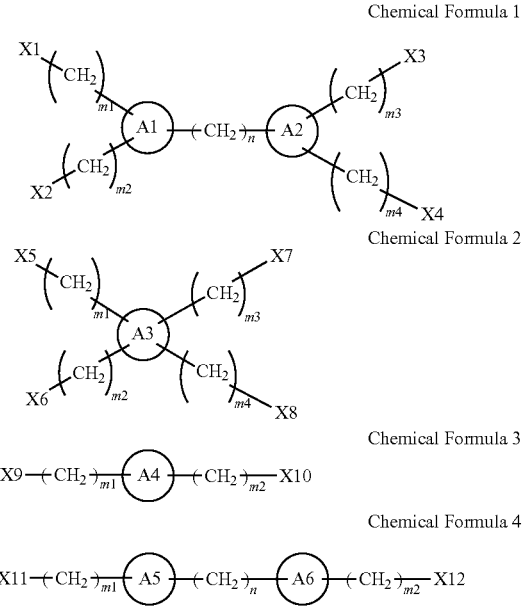

Chemical Formula 1

Chemical Formula 2

Chemical Formula 3

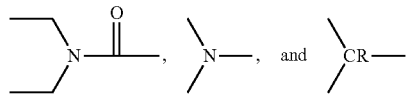

Chemical Formula 4

In Chemical Formula 1, Chemical Formula 2, Chemical Formula 3, and Chemical Formula 4, n indicates a natural number in a range of 2 to 11, and each of m1 to m4 independently indicates a natural number in a range of 1 to 4.

In Chemical Formula 1, Chemical Formula 2, Chemical Formula 3, and Chemical Formula 4, A1 and A2 independently indicate

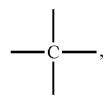

(herein, R is H or a C1 to C3 alkyl group), a C6 to C30 aromatic compound, or a C4 to C20 aliphatic cyclic compound, A3 is (an image of a carbon with four single bonds), a C6 to C30 aromatic compound, or a C4 to C20 aliphatic cyclic compound, and A4, A5, and A6 are independently a single bond, —CH$_2$—, —COO—, —OCO—, —S—, —O—, —CH$_2$CH$_2$O—, —OCH$_2$CH$_2$—, a C6 to C30 aromatic compound, or a C4 to C20 aliphatic cyclic compound. Herein, the aromatic compound may be a phenyl group, an alkyl substituted phenyl, a fluorine substituted phenyl, a biphenyl, a naphthalene, an anthracene, or a pentacene, without being limited thereto, and the aliphatic cyclic compound may be a cyclohexane, a cyclobutane, or a cyclopentane, without being limited thereto.

In Chemical Formula 1, Chemical Formula 2, Chemical Formula 3, and Chemical Formula 4, X1, X2, X3, X4, X5, X6, X7, X8, X9, X10, X11, and X12 independently indicate —OH, —NH$_2$, an acrylate group, a methacrylate group, a vinyl group, or

In the present exemplary embodiment, the cross-linking agent may be included in the photoalignment agent at about 3 wt % to 10 wt % with respect to all contents. For example, the cross-linking agent may be included in the photoalignment agent at about 5 wt % to 7 wt %.

In the present exemplary embodiment, the cross-linking agent may include a compound that is represented by Chemical Formula 5.

Chemical Formula 5

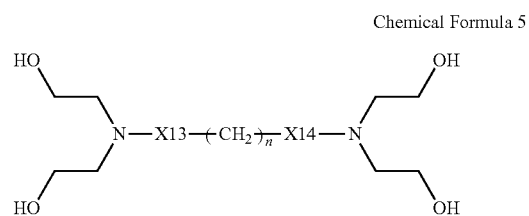

In Chemical Formula 5, n is a natural number of 3 to 11, X13 and X14 independently indicate —(CH$_2$)$_m$—O—, —O—(CH$_2$)$_m$—, —(CH$_2$)$_m$—S—, —S—(CH$_2$)$_m$— (herein, m is a natural number of 1 to 10),

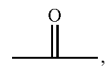

a C6 to C30 aromatic compound, or a C4 to C20 aliphatic cyclic compound.

In the present exemplary embodiment, the cross-linking agent may include a compound that is represented by Chemical Formula 6.

Chemical Formula 6

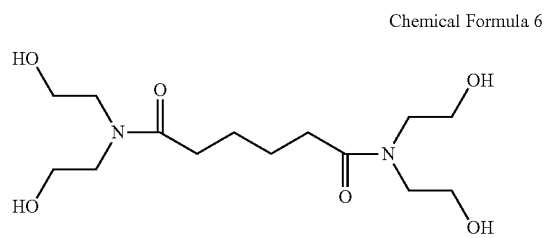 [SMILES: O=C(CCCCC(=O)N(CCO)CCO)N(CCO)CCO]

As described above, the cross-linking agent according to the present exemplary embodiment includes the alkylene group (—CH$_2$—) pertaining to the flexible group, and thus the photoalignment layer formed by using the photoalignment agent added with the cross-linking agent of the present exemplary embodiment may improve the film strength and minimizes deterioration of an afterimage.

Hereinafter, a manufacturing method of a photoalignment agent will be described according to the present exemplary embodiment.

Photoalignment Agent Manufacturing Method

A compound represented by Chemical Formula 7 at 1.0 moles and N-methyl-2-pyrolidone were mixed in a flask with four necks and including an agitator, a temperature adjuster, a gas injector for injecting nitrogen, and a cooler, under a dark room condition while passing nitrogen through the flask, to produce a mixed solution. A compound represented by Chemical Formula 9 at 1.0 mole was added into the mixed solution, and was subjected to agitation for about one hour. In this case, the reaction was performed for about 24 hours while maintaining the temperature in a range of 30 to 60° C., thereby producing a polyamic acid solution. This polyamic acid solution was distilled to obtain polyamic acid. The weight average molecular weight of the polyamic acid was in a range of 30,000 to 50,000. A mixed solvent (volume ratio=about 7:2) in which N-methyl-2-pyrolidone (NMP) and 2-butyl cellosolve were mixed was added to the polyamic acid, and was subjected to agitation for 24 hours at room temperature. A cross-linking agent represented by Chemical Formula 6 at about 5 wt % to 7 wt % was added into the mixed solvent, thereby producing a photoalignment agent including the polyamic acid and the cross-linking agent.

Chemical Formula 7

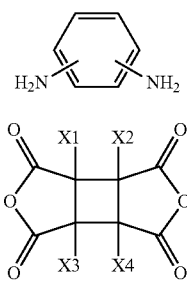

Chemical Formula 9

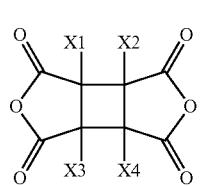

In Chemical Formula 9, X1 and X4 indicate a methyl group, and X2 and X3 indicate hydrogen.

Chemical Formula 6

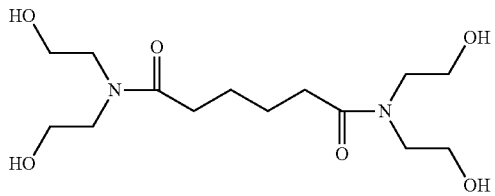

The aforementioned photoalignment agent was coated on an electrode, and the coated photoalignment agent was baked. The baking was performed by two steps of pre-baking and hard-baking. The polyamic acid and the photoalignment agent including the cross-linking agent may be connected to each other through esterification in the hard-baking step.

Thereafter, the first alignment layer may be formed by irradiating polarized light to the photoalignment agent. In this case, the irradiated light may be ultraviolet light having a range of 230 nanometers to 380 nanometers. For example, ultraviolet light of 254 nanometers may be used. The polarized light may have energy in a range of 0.20 J/cm² to 1.0 J/cm². For example, the polarized light may have energy in a range of 0.40 J/cm² to 0.5 J/cm².

In order to increase an alignment property, the photoalignment layer 11 may be baked once more.

In the present exemplary embodiment, the polymer included in the photoalignment layer may include at least one of repeated units that are respectively represented by Chemical Formula 10 and Chemical Formula 11.

Chemical Formula 10

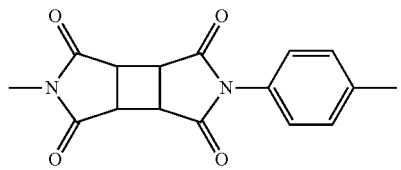

Chemical Formula 11

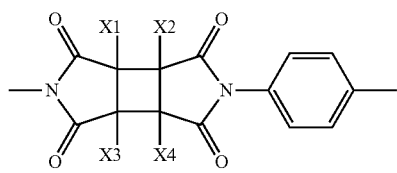

In Chemical Formula 11, X1, X2, X3, and X4 independently indicate hydrogen, a halogen, or an alkyl group, and at least one of X1, X2, X3, and X4 does not indicate hydrogen.

FIG. 1 schematically illustrates a cross-linking agent mixed in a photoalignment layer according to an exemplary embodiment of the present invention. The cross-linking agent mixed in the photoalignment layer according to the present exemplary embodiment may include a core and a spacer as shown in Chemical Formula 2. The core may include an aromatic compound such as a phenyl group, an alkyl substituted phenyl, a fluorine substituted phenyl, a biphenyl, a naphthalene, an anthracene, or a pentacene, a cyclohexane, a cyclobutane, or a cyclopentane. The spacer includes the alkylene group ($—C_nH_{2n}—$, n being a natural number) for providing a flexible characteristic to the photoalignment layer according to the present exemplary embodiment.

Chemical Formula 2

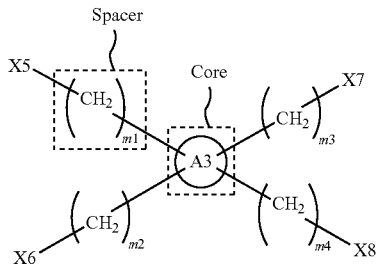

Referring to FIG. 1, the cross-linking agent of the present exemplary embodiment is disposed between chains of the alignment layer. The spacer may serve to connect the chains of the alignment layer to the cores of the cross-linking agent, and at least one of the groups such as X5, X6, X7, and X8 disposed at one ends of the spacers may be connected to one chain of the alignment layer. For example, —OH serving as the group disposed at one end of the spacer may be esterified with —COOH of the polyamic acid. —NH₂ serving as the group disposed at one end of the spacer may be amide-bonded to —COOH of the polyamic acid. An acrylate group or a methacrylate group serving as the group disposed at one end of the spacer may be polymerized to perform a cross-linking reaction. Herein, the chain of the alignment layer may be a copolymer formed from at least one of cyclobutane dianhydride (CBDA) and a cyclobutane dianhydride (CBDA) derivative, and a diamine.

Figure 2:
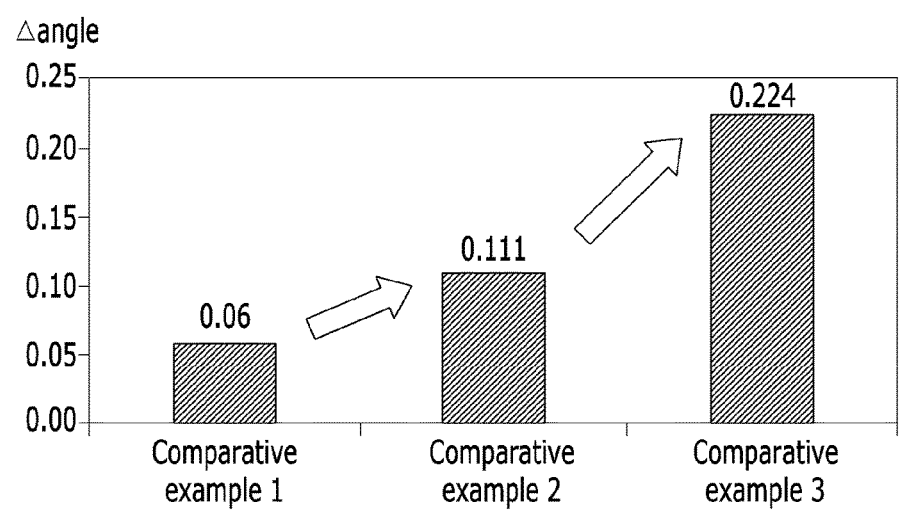
FIG. 2 is a graph illustrating the state of an afterimage after adding a rigid cross-linking agent into a photoalignment layer.

FIG. 2 is a graph illustrating the state of an afterimage in the case of adding a rigid cross-linking agent into a photoalignment layer.

In FIG. 2, in Comparative Example 1, a photoalignment layer in which no cross-linking agent is added into a photoalignment agent including the copolymer according to an exemplary embodiment of the present invention was used. In Comparative Example 2, a photoalignment layer in which a rigid cross-linking agent represented by Chemical Formula 5R at 3 wt % is added into the photoalignment agent was used. In Comparative Example 3, a photoalignment layer in which a rigid cross-linking agent represented by Chemical Formula 5R at 5 wt % is added into the photoalignment agent was used. Comparative Example 1, Comparative Example 2, and Comparative Example 3 were all subjected to a first baking process at a temperature of 210° C. for about 30 minutes, and then to polarization irradiation at 0.5 J/cm². Then, a second baking process was performed thereon at the temperature of 210° C. for about 30 minutes.

Chemical Formula 5R

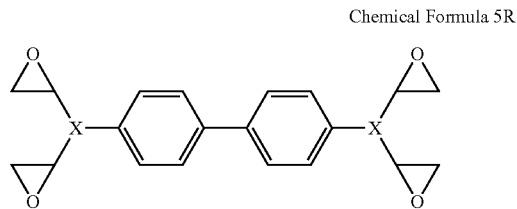

In Chemical Formula 5R, X may indicate

Referring to FIG. 2, as more rigid cross-linking agent is added, the afterimage is gradually deteriorated. Accordingly, this rigid cross-linking agent is not appropriate as a cross-linking agent for being added into the photoalignment layer since the afterimage is deteriorated even though the film strength may be improved. This rigid cross-linking agent may be a cross-linking agent including at least one C6 to C30 aromatic compound and an alkylene group ($—C_nH_{2n}—$, n being 0 or 1) of which the carbon number is smaller than 2.

Figure 3:
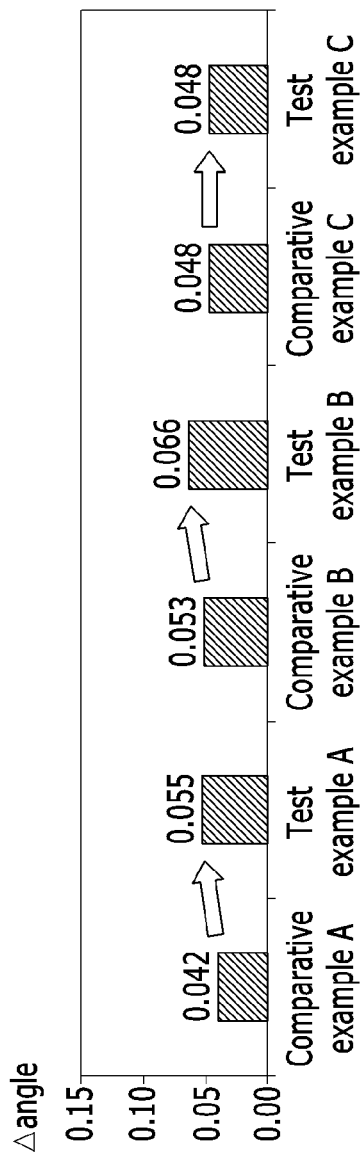
FIG. 3 is a graph illustrating the state of an afterimage after adding a flexible cross-linking agent into a photoalignment layer.

FIG. 3 is a graph illustrating the state of an afterimage in the case of adding a flexible cross-linking agent into a photoalignment layer.

In FIG. 3, in Comparative Example A, Comparative Example B, and Comparative Example C, photoalignment layers having no cross-linking agent were used. In Test Example A, Test Example B, and Test Example C, photoalignment layers in which a flexible cross-linking agent was added at 3 wt % were used. Comparative Example A and Test Example A were commonly subjected to the first baking process at a temperature 230° C. for about 900 seconds, and then to the polarization irradiation at 0.5 J/cm². Subsequently, the second baking process was performed thereon at a temperature of 210° C. for about 900 seconds. Comparative Example B and Test Example B were commonly subjected to the first baking process at the temperature 230° C. for about 900 seconds, and then to the polarization irradiation at 0.5 J/cm². Subsequently, the second baking process was performed thereon at the temperature of 230° C. for about 900 seconds. Comparative Example C and Test Example C were commonly subjected to the first baking process at a temperature 240° C. for about 900 seconds, and then to the polarization irradiation of 0.5 J/cm². Subsequently, the second baking process was performed thereon at the temperature of 210° C. for about 900 seconds.

Referring to FIG. 3, the afterimage was not deteriorated or was slightly deteriorated in Test Examples A, B, and C adding the flexible cross-linking agent, as compared with Comparative Examples A, B, and C.

Hereinafter, the principle of improving the film strength and minimizing afterimage deterioration by using a flexible cross-linking agent according to the present exemplary embodiment will be described with reference to FIG. 4 to FIG. 6.

Figure 4:
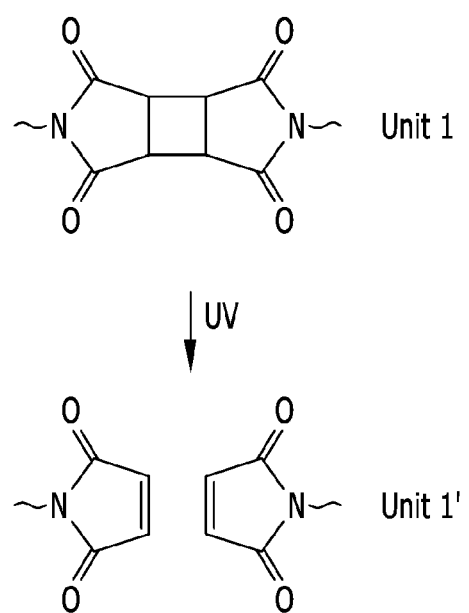
FIG. 4 is a structural formula illustrating decomposition of a polyimide in a photoalignment layer according to an exemplary embodiment of the present invention.

FIG. 4 is a structural formula illustrating decomposition of the polyimide in a photoalignment layer according to an exemplary embodiment of the present invention. FIG. 5 is a change process from isotropic to anisotropic in a photoalignment layer according to an exemplary embodiment of the present invention.

Referring to FIG. 4, after cyclobutane dianhydride (CBDA) and the diamine are copolymerized to form polyamic acid, a polyimide (Unit 1) is formed through a baking process according to the present invention exemplary embodiment, and UV light is radiated on the polyimide to form a maleimide (Unit 1').

Figure 5:
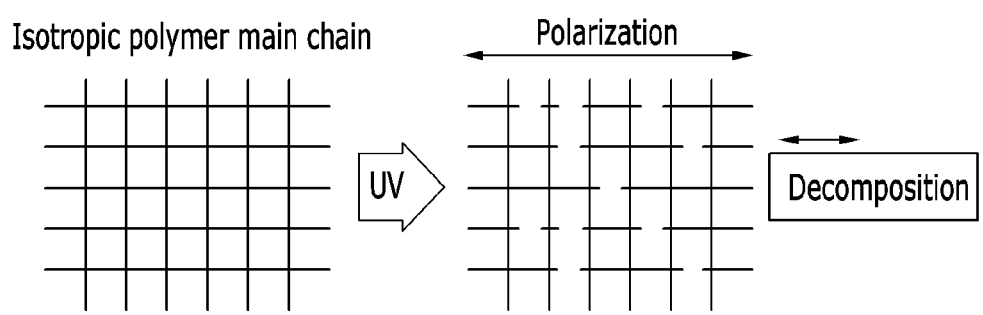
FIG. 5 illustrates a change process from isotropic to anisotropic in a photoalignment layer according to an exemplary embodiment of the present invention.

FIG. 5 illustrates that a polymer main chain including the polyimide (unit 1) illustrated in FIG. 4 is decomposed according to radiation of polarized UV light. Referring to FIG. 5, polarized UV light is radiated on an isotropic polymer main chain, photodecomposition occurs in a polarization direction (absorption axis direction), and thus a photoalignment layer may be aligned in a direction that is perpendicular to the polarization direction. Herein, if an exposure amount is excessively small, since decomposition efficiency is low, the alignment property may deteriorate. On the contrary, if the exposure amount is excessively increased, since decomposition efficiency is increased, decomposition occurs in another direction in addition to the polarization direction, and thus the alignment property may deteriorate.

Figure 6:
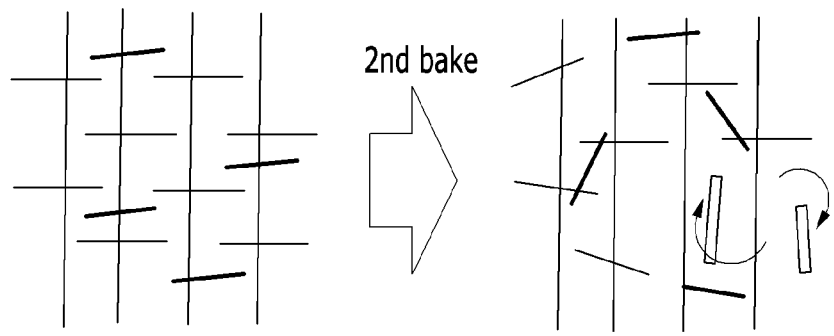
FIG. 6 illustrates a principle of ameliorating an afterimage in a photoalignment layer formed by using a photoalignment agent including a flexible cross-linking agent, according to an exemplary embodiment of the present invention.
Figure 6:
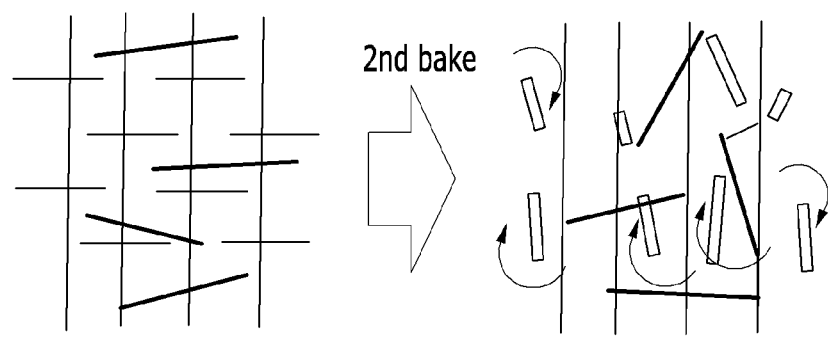

FIG. 6 illustrates a principle of improving an afterimage in a photoalignment layer formed by using a photoalignment agent added with a flexible cross-linking agent according to an exemplary embodiment of the present invention.

Referring to FIG. 6, when the second bake process is performed on the photoalignment layer including the rigid cross-linking agent, the rigid cross-linking agent obstructs the rearrangement of the photo-decomposed molecules. As a result, it may be difficult to improve the afterimage due to the rearrangement. However, according to the present exemplary embodiment, when the photoalignment layer including the flexible cross-linking agent is subjected to the second baking process, the photo-decomposed molecules may be more easily rearranged, thereby improving the afterimage with the rearrangement. The second baking process is a process of baking the photoalignment layer one more time to improve an alignment property.

Hereinafter, a liquid crystal display device including a photoalignment layer according to an exemplary embodiment of the present invention will be described.

Figure 7:
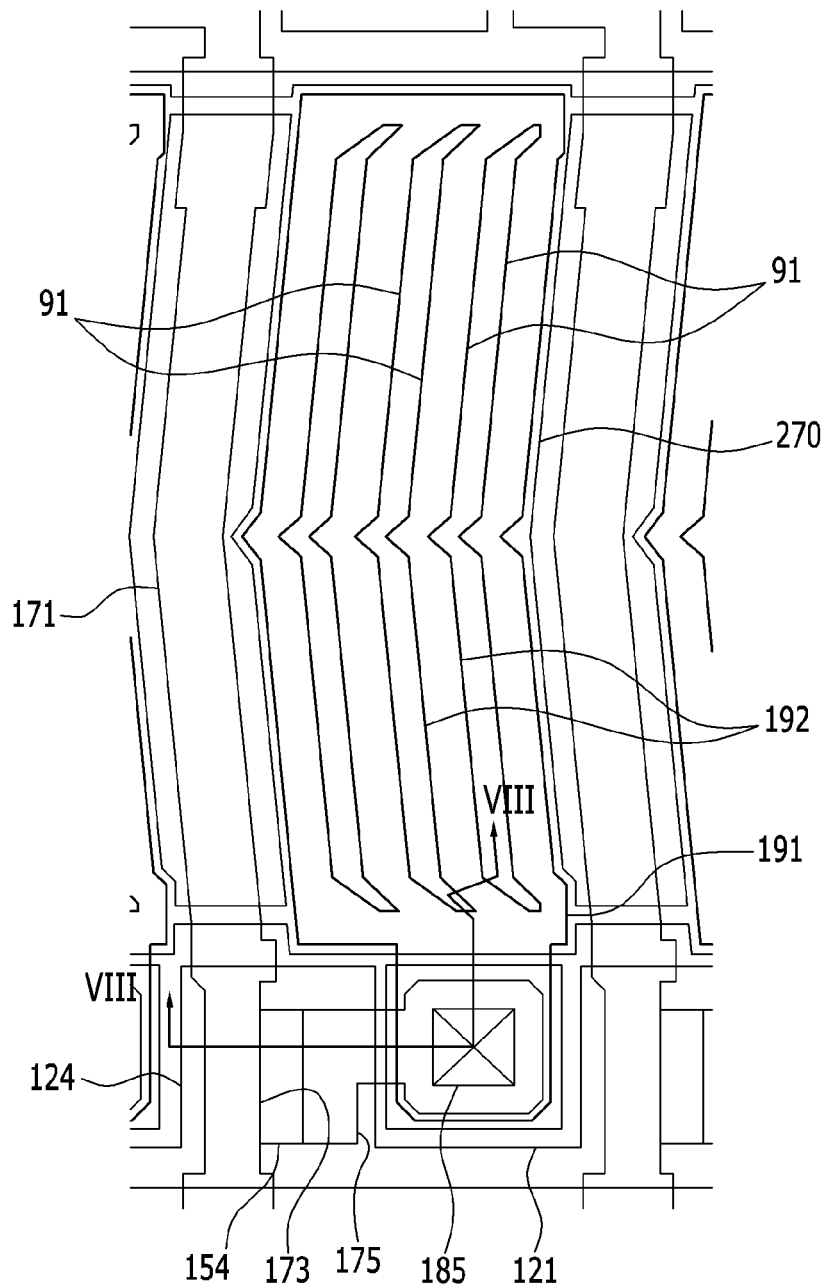
FIG. 7 is a top plan view illustrating a liquid crystal display device according to an exemplary embodiment of the present invention.
Figure 8:
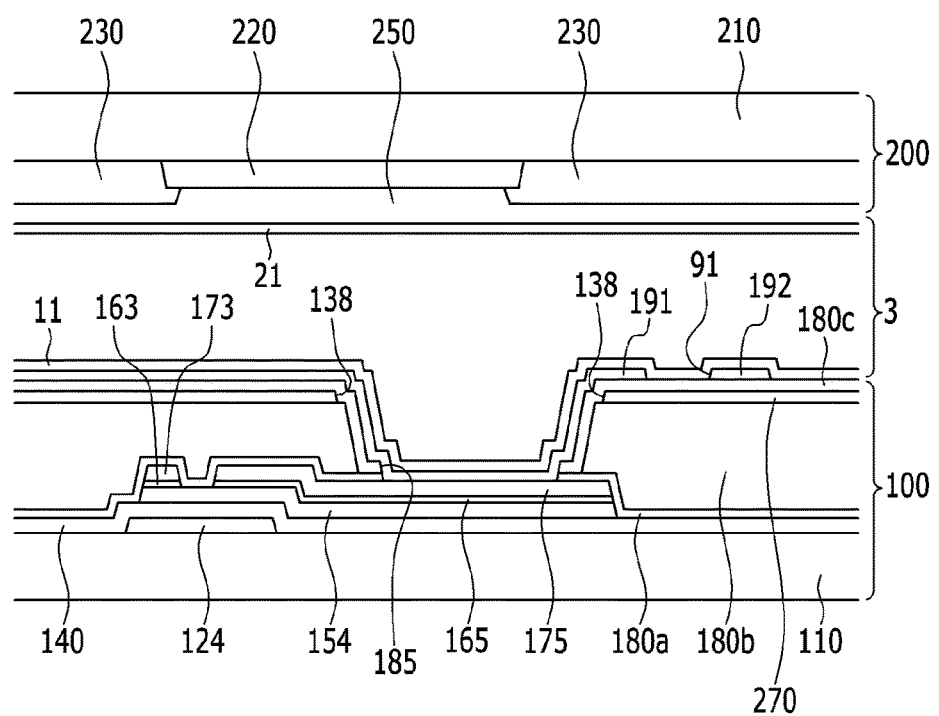
FIG. 8 is cross-sectional view of FIG. 7 taken along the line VIII-VIII.

FIG. 7 is a top plan view illustrating a liquid crystal display device according to an exemplary embodiment of the present invention. FIG. 8 is cross-sectional view taken along the line VIII-VIII of FIG. 7.

Referring to FIG. 7 and FIG. 8, the liquid crystal display device according to the present invention exemplary embodiment includes a lower display panel 100 and an upper display panel 200 facing each other, and a liquid crystal layer 3 injected therebetween.

First, the lower display panel 100 will be described.

A gate conductor including a gate line 121 is formed on a first substrate 110 made of transparent glass, plastic, or the like.

The gate line 121 includes a gate electrode 124 and a wide end portion (not illustrated) for connection with another layer or an external driving circuit. The gate line 121 may be made of at least one of aluminum (Al) or an aluminum alloy, silver (Ag) or a silver alloy, copper (Cu) or a copper alloy, molybdenum (Mo) or a molybdenum alloy, chromium (Cr), tantalum (Ta), and titanium (Ti). The gate line 121 may have a multilayer structure including at least two conductive layers having different physical properties.

A gate insulating layer 140 made of silicon nitride (SiNx), silicon oxide (SiOx), or the like is formed on the gate line 121. The gate insulating layer 140 may have a multilayer structure including at least two insulating layers having different physical properties.

A semiconductor layer 154 made of amorphous silicon or polysilicon is positioned on the gate insulating layer 140. The semiconductor layer 154 may include an oxide semiconductor.

Ohmic contacts 163 and 165 are formed on the semiconductor layer 154. The ohmic contacts 163 and 165 may be made of a material such as n+ hydrogenated amorphous silicon in which an n-type impurity such as phosphorus is doped at a high concentration, or of a silicide. The ohmic contacts 163 and 165 may be disposed on the semiconductor layer 154 to make a pair. In the case where the semiconductor layer 154 is the oxide semiconductor, the ohmic contacts 163 and 165 may be omitted.

A data conductor including a data line 171 including a source electrode 173 and a drain electrode 175 is formed on the ohmic contacts 163 and 165 and the gate insulating layer 140.

The data line 171 includes a wide end portion (not illustrated) for connection with another layer or an external driving circuit. The data line 171 transfers a data signal, and mainly extends in a vertical direction to cross the gate line 121.

In this case, the data line 171 may have a first curved portion having a curved shape in order to acquire maximum transmittance of the liquid crystal display device, and the curved portion meets itself in a middle region of the pixel area to have a V-lettered shape.

The source electrode 173 is a part of the data line 171, and is disposed on the same line as the data line 171. The drain electrode 175 is formed to extend in parallel with the source electrode 173. Accordingly, the drain electrode 175 is parallel with the part of the data line 171.

The gate electrode 124, the source electrode 173, and the drain electrode 175 form one thin film transistor (TFT) together with the semiconductor layer 154, and a channel of the thin film transistor is formed in the semiconductor layer 154 portion between the source electrode 173 and the drain electrode 175.

The liquid crystal display device according to the present exemplary embodiment includes the source electrode 173 positioned on the same line as the data line 171 and the drain electrode 175 extending in parallel with the data line 171, and as a result, a width of the thin film transistor may be increased while an area occupied by the data conductor is not increased, thereby increasing an aperture ratio of the liquid crystal display device.

The data line 171 and the drain electrode 175 may be made of a refractory metal such as molybdenum, chromium, tantalum, and titanium, or an alloy thereof, and may have a multilayered structure including a refractory metal layer (not illustrated) and a low resistive conductive layer (not illustrated). An example of the multilayered structure may include a double layer of a chromium or molybdenum (alloy) lower layer and an aluminum (alloy) upper layer, or a triple layer of a molybdenum (alloy) lower layer, an aluminum (alloy) middle layer, and a molybdenum (alloy) upper layer.

A first passivation layer 180a is disposed on the data conductors 171, 173, and 175, the gate insulating layer 140, and an exposed portion of the semiconductor layer 154. The first passivation layer 180a may be made of an organic insulating material or an inorganic insulating material.

A second passivation layer 180b is formed on the first passivation layer 180a. The second passivation layer 180b may be made of an organic insulating material.

The second passivation layer 180b may be a color filter. In the case where the second passivation layer 180b is the color filter, the second passivation layer 180b may uniquely display one of primary colors, and an example of the primary colors may include three primary colors such as red, green, and blue, or yellow, cyan, and magenta, and the like. Although not illustrated, the color filter may further include a color filter displaying a mixed color of the primary colors or white other than the primary colors. In the case where the second passivation layer 180b is the color filter, the color filter 230 may be omitted in the upper display panel 200 to be described below. Unlike in the present exemplary embodiment, the second passivation layer 180b may be formed by using an organic insulating material, and a color filter (not shown) may be formed between the first passivation layer 180a and the second passivation layer 180b.

A common electrode 270 is formed on the second passivation layer 180b. The common electrode 270 has a planar shape and may be formed on the entire surface of the substrate 110 as a whole plate, and has an opening 138 disposed in a region corresponding to a periphery of the drain electrode 175. That is, the common electrode 270 may have the planar shape as the plate shape.

Common electrodes 270 positioned at adjacent pixels are connected to each other to receive a common voltage having a predetermined magnitude supplied from outside of a display area.

An insulating layer 180c is positioned on the common electrode 270. The insulating layer 180c may be made of an organic insulating material, an inorganic insulating material, or the like.

A pixel electrode 191 is positioned on the insulating layer 180c. The pixel electrode 191 includes a curved edge which is substantially parallel with the curved portion of the data line 171. The pixel electrode 191 has a plurality of cutouts 91, and includes a plurality of branch electrodes 192 positioned between the adjacent cutouts 91.

The pixel electrode 191 is a first field generating electrode or a first electrode, and the common electrode 270 is a second field generating electrode or a second electrode. A horizontal electric field may be generated between the pixel electrode 191 and the common electrode 270.

A first contact hole 185 exposing the drain electrode 175 is formed in the first passivation layer 180a, the second passivation layer 180b, and the insulating layer 180c. The pixel electrode 191 is physically and electrically connected to the drain electrode 175 through the contact hole 185 to receive a voltage from the drain electrode 175.

A first alignment layer 11 is formed on the pixel electrode 191 and the insulating layer 180c. The first alignment layer 11 includes a photoreactive material.

In the present exemplary embodiment, the first alignment layer 11 includes the photoalignment layer according to the aforementioned exemplary embodiment of the present invention.

Herein, a method of forming the alignment layer will be described.

A photoalignment agent according to an exemplary embodiment of the present invention is coated on the pixel electrode 191, and the coated photoalignment agent is baked. The baking may be performed by two steps of pre-baking and hard-baking. In the hard-baking, the polyamic acid included in the photoalignment agent may be converted into a polyimide, and the flexible cross-linking agent may be esterified to be bonded to the polyimide at the temperature of 150° C. to 200° C.

Thereafter, the first alignment layer 11 may be formed by irradiating polarized light to the photoalignment agent. In this case, the irradiated light may be ultraviolet light having a range of 230 nanometers to 380 nanometers. For example, ultraviolet light of 254 nanometers may be used. The polarized light may have energy in a range of 0.20 J/cm$^2$ to 1.0 J/cm$^2$. For example, the polarized light may have energy in a range of 0.40 J/cm$^2$ to 0.5 J/cm$^2$.

In order to increase an alignment property, the first alignment layer 11 may be baked once more. In this case, the photo-decomposed molecules may be rearranged to increase the anisotropy.

Next, the upper display panel 200 will be described.

A light blocking member 220 is formed on a second substrate 210 made of transparent glass or plastic. The light blocking member 220 is called a black matrix and blocks light leakage.

A plurality of color filters 230 are formed on the second substrate 210. In the case where the second passivation layer 180b of the lower display panel 100 is a color filter or where a color filter is formed on the lower display panel 100, the color filter 230 of the upper display panel 200 may be omitted. Further, the light blocking member 220 of the upper display panel 200 may also be formed on the lower display panel 100.

An overcoat 250 is formed on the color filter 230 and the light blocking member 220. The overcoat 250 may be made of an (organic) insulating material, prevents the color filter 230 from being exposed, and provides a flat surface. The overcoat 250 may be omitted.

A second alignment layer 21 is formed on the overcoat 250. The second alignment layer 21 may be formed by the same material and the same method as the first alignment layer 11 described above.

In the present exemplary embodiment, the liquid crystal layer 3 may include a liquid crystal material having negative or positive dielectric anisotropy.

The liquid crystal molecules of the liquid crystal layer 3 are aligned so that long axes thereof are parallel to the panels 100 and 200.

The pixel electrode 191 receives a data voltage from the drain electrode 175, and the common electrode 270 receives a common voltage having a predetermined magnitude from a common voltage applying unit disposed outside of the display area.

The pixel electrode 191 and the common electrode 270 serving as field-generating electrodes generate an electric field, and thus the liquid crystal molecules of the liquid crystal layer 3 positioned on the two field-generating electrodes 191 and 270 may rotate in a direction parallel to the electric field. Polarization of light passing through the liquid crystal layer varies according to the rotation directions of the liquid crystal molecules determined as described above.

As such, the two field generating electrodes 191 and 270 are formed on one display panel 100, thereby increasing transmittance of the liquid crystal display device and implementing a wide viewing angle.

In the liquid crystal display device according to the illustrated exemplary embodiment, the common electrode 270 has the planar shape, and the pixel electrode 191 has the plurality of branch electrodes, but in a liquid crystal display device according to another exemplary embodiment of the present invention, the pixel electrode 191 may have the planar shape, and the common electrode 270 may have the plurality of branch electrodes.

The present invention may be applied to other embodiments where the two field generating electrodes are overlapped with each other on the first substrate 110 with an insulating layer therebetween, the first field generating electrode formed below the insulating layer has a planar shape, and the second field generating electrode formed on the insulating layer has a plurality of branch electrodes.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A photoalignment agent, comprising:
    a copolymer obtained from:
        at least one of cyclobutane dianhydride (CBDA) and a cyclobutane dianhydride derivative; and
        a diamine; and
    a cross-linking agent comprising at least one compound respectively represented by Chemical Formula 2, Chemical Formula 3, and Chemical Formula 4:

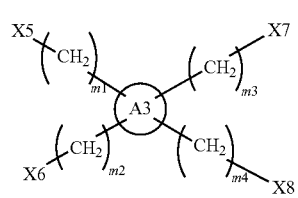

Chemical Formula 2

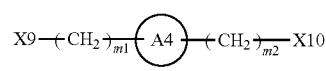

Chemical Formula 3

-continued

Chemical Formula 4

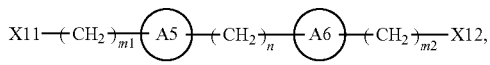

wherein:
n is a natural number in a range of 2 to 11;
each of m1 to m4 independently indicates a natural number in a range of 1 to 4;
A3 is

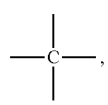

a C6 to C30 aromatic compound, or a C4 to C20 aliphatic cyclic compound;

A4 is —COO—, —OCO—, —S—, —O—, —CH$_2$CH$_2$O—, —OCH$_2$CH$_2$—, a C6 to C30 aromatic compound, or a C4 to C20 aliphatic cyclic compound;

A5 and A6 are independently —CH$_2$—, —COO—, —OCO—, —S—, —O—, —CH$_2$CH$_2$O—, —OCH$_2$CH$_2$—, a C6 to C30 aromatic compound, or a C4 to C20 aliphatic cyclic compound;

X5, X6, X7, X8, X9, and X10 independently indicate —OH, —NH$_2$, an acrylate group, a methacrylate group, a vinyl group, or

and

X11 and X12 independently indicate —OH, —NH$_2$, an acrylate group, a methacrylate group, or a vinyl group; and when X9 is —OH, X10 is not —OH,
when X10 is —OH, X9 is not —OH,
when X11 is —OH, X12 is not —OH, and
when X12 is —OH, X11 is not —OH.

2. The photoalignment agent of claim 1, wherein:
the cross-linking agent further comprises a compound represented by Chemical Formula 1:

Chemical Formula 1

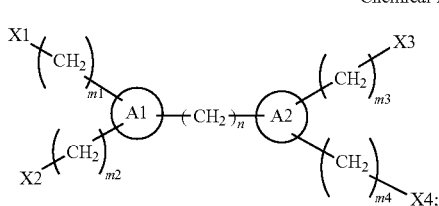

n is a natural number in a range of 2 to 11;
each of m1 to m4 independently indicates a natural number in a range of 1 to 4;

A1 and A2 are independently

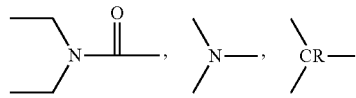

(R being H or a C1 to C3 alkyl group), a C6 to C30 aromatic compound, or a C4 to C20 aliphatic cyclic compound; and X1, X2, X3, and X4 independently indicate —OH, —NH$_2$, an acrylate group, a methacrylate group, a vinyl group, or

3. The photoalignment agent of claim 2, wherein:
the compound represented by Chemical Formula 1 comprises a compound represented by Chemical Formula 5:

Chemical Formula 5

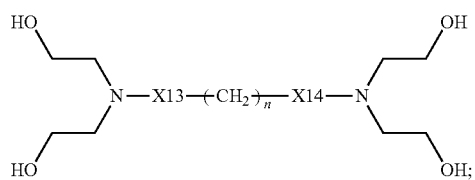

n is a natural number of 3 to 11; and
X13 and X14 indicate

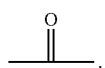

4. The photoalignment agent of claim 3, wherein the compound represented by Chemical Formula 5 comprises a compound represented by Chemical Formula 6:

Chemical Formula 6

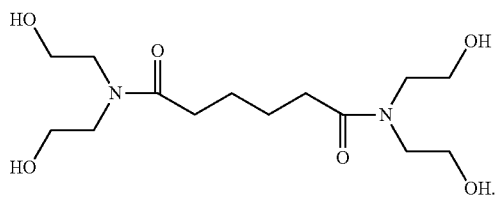

5. The photoalignment agent of claim 4, wherein the photoalignment agent comprises about 3 wt % to 10 wt % of the cross-linking agent, with respect to all contents.

6. The photoalignment agent of claim 5, wherein the diamine comprises a compound represented by Chemical Formula 7:

Chemical Formula 7

7. The photoalignment agent of claim 1, wherein the cyclobutane dianhydride comprises a compound represented by Chemical Formula 8, and the cyclobutane dianhydride derivative comprises a compound represented by Chemical Formula 9:

Chemical Formula 8

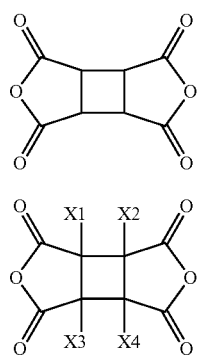

Chemical Formula 9 wherein, X1, X2, X3, and X4 independently indicate hydrogen, a halogen, or an alkyl group, and at least one of X1, X2, X3, and X4 does not indicate hydrogen.

8. The photoalignment agent of claim 1, wherein the copolymer further comprises polyamic acid.

9. A photoalignment layer comprising the photoalignment agent of claim 1, wherein the copolymer further comprises a polyimide.

10. A liquid crystal display, comprising:
a first substrate;
a thin-film transistor disposed on the first substrate;
a first electrode connected to the thin-film transistor; and
a first alignment layer disposed on the first electrode,
wherein the first alignment layer comprises:
a copolymer obtained from at least one of cyclobutane dianhydride (CBDA) and a cyclobutane dianhydride derivative, and a diamine; and
a cross-linking agent comprising at least one compound respectively represented by Chemical Formula 2, Chemical Formula 3, and Chemical Formula 4:

Chemical Formula 2

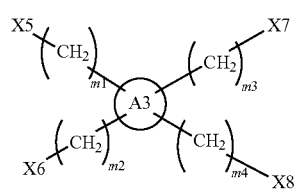

Chemical Formula 3

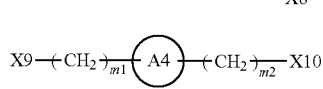

Chemical Formula 4

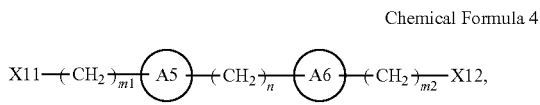

and
wherein:
n indicates a natural number in a range of 2 to 11;
each of m1 to m4 independently indicates a natural number in a range of 1 to 4;
A3 is

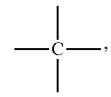

a C6 to C30 aromatic compound, or a C4 to C20 aliphatic cyclic compound;
A4 is —COO—, —S—, —O—, —CH$_2$CH$_2$O—, —OCH$_2$CH$_2$—, a C6 to C30 aromatic compound, or a C4 to C20 aliphatic cyclic compound;
A5 and A6 are independently —CH$_2$—, —COO—, —OCO—, —S—, —O—, —CH$_2$CH$_2$O—, —OCH$_2$CH$_2$—, a C6 to C30 aromatic compound, or a C4 to C20 aliphatic cyclic compound;
X5, X6, X7, X8, X9, and X10 independently indicate —OH, —NH$_2$, an acrylate group, a methacrylate group, a vinyl group, or

and
X11 and X12 independently indicate —OH, —NH$_2$, an acrylate group, a methacrylate group, or a vinyl group, and
when X9 is —OH, X10 is not —OH,
when X10 is —OH, X9 is not —OH,
when X11 is —OH, X12 is not —OH, and
when X12 is —OH, X11 is not —OH.

11. The liquid crystal display of claim 10, wherein:
the cross-linking agent further comprises a compound represented by Chemical Formula 1:

Chemical Formula 1

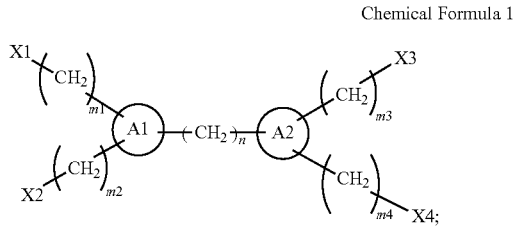

n is a natural number in a range of 2 to 11;
each of m1 to m4 independently indicates a natural number in a range of 1 to 4;
A1 and A2 are independently

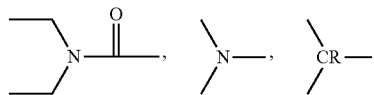

(R being H or a C1 to C3 alkyl group), a C6 to C30 aromatic compound, or a C4 to C20 aliphatic cyclic compound; and X1, X2, X3, and X4 independently indicate —OH, —NH₂, an acrylate group, a methacrylate group, a vinyl group, or

12. The photoalignment agent of claim 11, wherein:
the compound represented by Chemical Formula 1 comprises a compound represented by Chemical Formula 5:

Chemical Formula 5

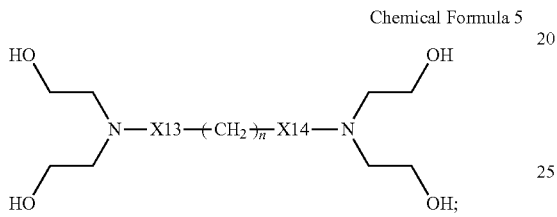

n is a natural number of 3 to 11; and
X13 and X14 indicate

13. The liquid crystal display of claim 12, wherein the compound represented by Chemical Formula 5 comprises a compound represented by Chemical Formula 6:

Chemical Formula 6

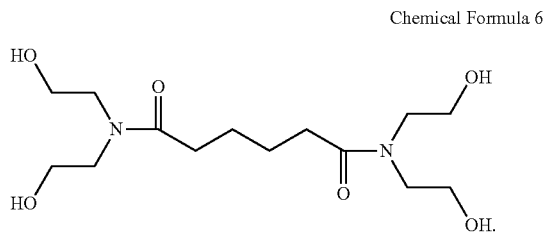 [SMILES: O=C(CCCCC(=O)N(CCO)CCO)N(CCO)CCO]

14. The liquid crystal display of claim 13, wherein the first alignment layer comprises about 3 wt % to 10 wt % of the cross-linking agent, with respect to all contents.

15. The liquid crystal display of claim 14, wherein the diamine comprises a compound represented by Chemical Formula 7:

Chemical Formula 7

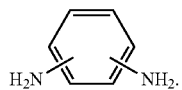

16. The liquid crystal display of claim 15, wherein the copolymer comprises at least one of a compound represented by Chemical Formula 10 and Chemical Formula 11:

Chemical Formula 10

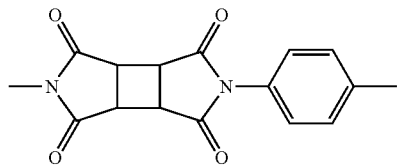

Chemical Formula 11

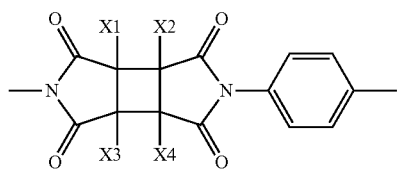

wherein, X1, X2, X3, and X4 independently indicate hydrogen, a halogen, or an alkyl group, and at least one of X1, X2, X3, and X4 does not indicate hydrogen.

17. The liquid crystal display of claim 11, further comprising:
a second electrode disposed on the first substrate; and
an insulating layer disposed between the first electrode and the second electrode.

18. The liquid crystal display of claim 17, wherein:
the first electrode comprises branch electrodes; and
the second electrode has a planar shape.

19. The liquid crystal display of claim 18, wherein the branch electrodes overlap the second electrode.

20. The liquid crystal display of claim 19, further comprising:
a passivation layer disposed between the thin-film transistor and the second electrode,
wherein the thin-film transistor and the first electrode are connected to each other through a contact hole disposed in the passivation layer and the insulating layer.

21. The liquid crystal display of claim 20, further comprising:
a second substrate facing the first substrate;
a second alignment layer disposed on the second substrate; and
a liquid crystal layer disposed between the first substrate and the second substrate, the liquid crystal layer comprising liquid crystal molecules,
wherein the second alignment layer comprises the same material as the first alignment layer.

* * * * *